Oct. 4, 1955  L. S. KASSEL  2,719,822
PRODUCTION OF CHLORINE FROM HYDROGEN CHLORIDE
Filed Jan. 10, 1952
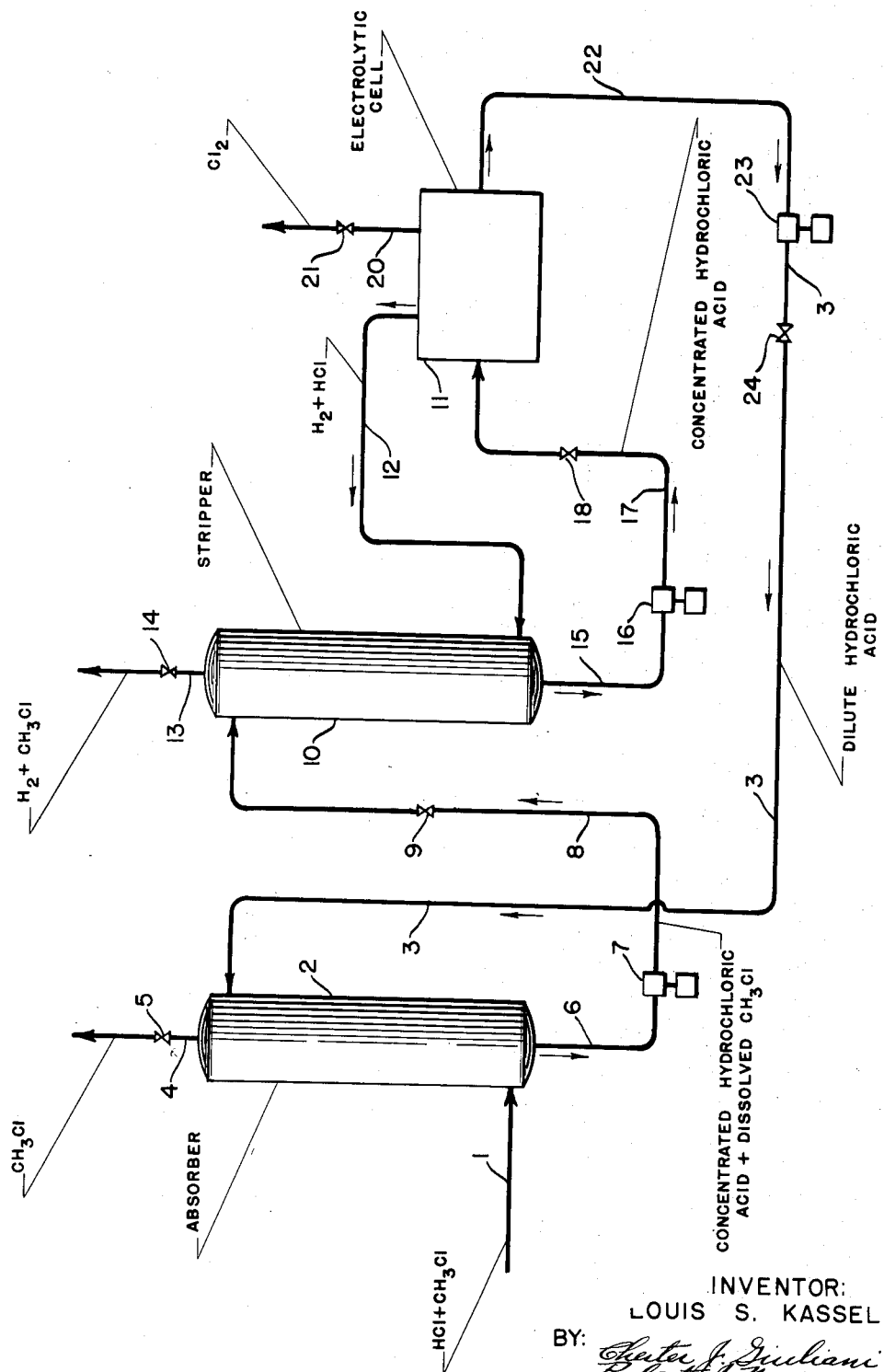
INVENTOR:
LOUIS S. KASSEL
BY:
ATTORNEYS:

United States Patent Office

2,719,822
Patented Oct. 4, 1955

2,719,822
PRODUCTION OF CHLORINE FROM HYDROGEN CHLORIDE

Louis S. Kassel, Oak Park, Ill., assignor to Universal Oil Products Company, Chicago, Ill., a corporation of Delaware Application January 10, 1952, Serial No. 265,735

5 Claims. (Cl. 204—128)

This invention relates to the production of chlorine. It is more particularly concerned with a method for producing chlorine from hydrogen chloride.

Hydrogen chloride is produced in large quantities as a by-product in organic chlorinations and other chemical reactions. Since the demand for chlorine is, and has been for some time, considerably greater than the demand for hydrogen chloride, there frequently are situations in which it becomes desirable to convert hydrogen chloride to hydrogen and chlorine. One method of accomplishing this conversion comprises absorbing hydrogen chloride from a gas stream containing the same, by means of dilute recycle hydrochloric acid produced in the process. Concentrated hydrochloric acid from the absorber is passed to an electrolytic cell in which hydrogen and chlorine gases are generated in separate compartments. Dilute hydrochloric acid solution leaves the electrolytic cell and is returned to the absorber.

A major disadvantage of this process lies in the fact that the gaseous hydrogen chloride charged to the absorber usually contains other components which are partially soluble in hydrochloric acid. These components are dissolved in the hydrochloric acid, are carried to the electrolytic cell, and there are at least partially released along with the gases generated in the cell. This results in contamination of the chlorine produced in the cell. Another disadvantage lies in the fact that the hydrogen produced in the electrolytic cell usually is contaminated with hydrogen chloride. Accordingly, it is necessary to provide a separate cooler to minimize loss of HCl in this stream. I have invented an improved method of producing chlorine from hydrogen chloride which overcomes both of these disadvantages.

It is an object of this invention to produce chlorine.

It is another object of this invention to produce substantially pure chlorine from hydrogen chloride contaminated with components that are at least partially soluble in hydrochloric acid.

A further object of this invention is to obtain high yields of chlorine in the electrolytic decomposition of hydrochloric acid.

A still further object of this invention is to provide a relatively simple, integrated process for producing high yields of substantially pure chlorine from contaminated hydrogen chloride.

In one embodiment my invention relates to a process for producing chlorine which comprises absorbing hydrogen chloride from a gaseous stream containing the same, by contacting said stream with dilute hydrochloric acid, separating the concentrated hydrochloric acid thus produced, contacting a gaseous stream comprising hydrogen and hydrogen chloride, produced as hereinafter set forth, with at least a portion of said concentrated hydrochloric acid to absorb said hydrogen chloride in the concentrated hydrochloric acid, subjecting at least a portion of the resultant hydrochloric acid to electrolysis to produce gaseous chlorine, gaseous hydrogen contaminated with hydrogen chloride, and dilute hydrochloric acid, recovering the chlorine, contacting at least a portion of said gaseous hydrogen with concentrated hydrochloric acid as aforesaid, and returning at least a portion of the dilute hydrochloric acid to the first-mentioned contacting step.

In a more specific embodiment my invention relates to a process for producing chlorine from a gaseous stream comprising hydrogen chloride and methyl chloride which comprises intimately contacting said stream with a stream of dilute hydrochloric acid in an absorber, withdrawing from said absorber a gaseous stream of methyl chloride substantially free from hydrogen chloride, and a stream of concentrated hydrochloric acid containing methyl chloride dissolved therein, introducing said concentrated hydrochloric acid into the upper portion of a stripping column and a gaseous stream of hydrogen and hydrogen chloride, produced as hereinafter set forth, into the lower portion of said column, and therein countercurrently contacting said streams to strip the methyl chloride from the acid and absorb the gaseous hydrogen chloride in the acid, withdrawing a gaseous stream comprising hydrogen and methyl chloride from the upper portion and a stream of concentrated hydrochloric acid, substantially free from methyl chloride, from the lower portion of said column, passing the last-mentioned concentrated hydrochloric acid to an electrolytic cell and therein generating a gaseous stream of chlorine, a gaseous stream of hydrogen contaminated with hydrogen chloride, and dilute hydrochloric acid, recovering the chlorine, passing the hydrogen stream to said stripping column, and recycling the dilute hydrochloric acid to said absorber.

Briefly, the process of my invention comprises charging a stream of gaseous hydrogen chloride, containing components that are partially soluble in hydrochloric acid, to an absorber, and therein contacting the same with a stream of dilute recycle hydrochloric acid from an electrolytic cell. I withdraw concentrated hydrochloric acid from the absorber and introduce it into the top of the stripping column. The hot crude hydrogen stream, containing an appreciable amount of hydrogen chloride, is taken directly from the electrolytic cell that is used to electrolyze hydrochloric acid and is passed into the bottom of the stripping column where it serves as a stripping agent. The volume of this gas stream is large in comparison with the volume of liquid charged to the stripper, and is adequate to give substantially complete removal of moderately soluble impurities present in the concentrated acid. At the same time, the heat capacity of the liquid stream is large in comparison with that of the hydrogen, so that hydrogen leaves the top of the stripper at substantially the temperature of the inlet acid. This temperature is low enough so that there is very little loss of hydrogen chloride in the exit hydrogen. In other words, the gaseous hydrogen stream strips the soluble contaminants from the hydrochloric acid, and the bulk of the hydrogen chloride in the hydrogen stream is absorbed in the hydrochloric acid. If desired, the small amount of hydrogen chloride appearing in the gaseous stream withdrawn from the stripper may be further reduced by refluxing the top of the stripper with a small quantity of water.

If the hydrogen chloride stream fed to the absorber contains no contaminants, the use of the stripping column in my process serves the useful purpose of minimizing loss of hydrogen chloride in the hydrogen stream. If this stripper were not provided, it would be necessary to provide a separate cooler in order to minimize loss of hydrogen chloride in said hydrogen stream, and also to provide a means of returning the hydrogen chloride to the electrolytic cell. In the usual case in which the hydrogen chloride stream contains components such as methyl chloride, that are soluble in the hydrochloric acid, the stripper serves a dual purpose. It not only minimizes loss of hydrogen chloride in the hot hydrogen stream from the electrolytic cell, but it also removes impurities from the concentrated hydrochloric acid fed to the cell, thereby resulting in purer gaseous products from said cell.

Additional features and advantages of my invention will become apparent from the following description of the flow diagram shown in the figure.

Referring to the drawing, a gaseous stream comprising hydrogen chloride and methyl chloride, consisting for example of 20 mol percent hydrogen chloride and 80 mol percent methyl chloride and obtained as a by-product from the reaction of phosphorus trichloride and methyl alcohol, is passed through line 1 into absorber 2 near the bottom thereof. Dilute hydrochloric acid, prepared as hereinafter set forth, is passed through line 3 and into absorber 2 near the top thereof. This dilute hydrochloric acid stream usually will contain about 10 weight percent hydrogen chloride, although the percentage hydrogen chloride may be varied above or below this figure. In general, the concentration of hydrogen chloride will lie between 10 and 20 weight percent.

The upwardly flowing gases are intimately contacted with the downwardly flowing hydrochloric acid. The gaseous hydrogen chloride is absorbed in the dilute hydrochloric acid, thereby making the latter more concentrated in hydrogen chloride. At the same time, a small amount, approximately 0.3% by weight, of methyl chloride is absorbed in the hydrochloric acid.

Absorber 2 may be of any conventional type and have means such as packing, bubble cap trays, or the like for effecting intimate contacting between the gases and the liquid. Cooling means may be provided to remove heat of solution. The flow of gaseous hydrogen chloride and liquid hydrochloric acid does not necessarily need to be countercurrent, since any suitable contacting apparatus may be used as, for example, a cocurrent falling film absorber.

Gaseous methyl chloride, substantially free from hydrogen chloride, is removed from the top of absorber 2 through line 4 containing valve 5. Concentrated hydrochloric acid, usually containing from about 26 to about 36 weight percent hydrogen chloride, and preferably about 26–34% or 30–33% hydrogen chloride, is withdrawn from the bottom of the absorber 2 through line 6, is picked up by pump 7, and discharged into line 8 containing valve 9 and passed into stripper 10 near the top thereof.

A stream of hot crude gaseous hydrogen containing hydrogen chloride in an amount that is usually less than about 10%, is withdrawn from electrolytic cell 11 and is passed through line 12 into the bottom of stripper 10. As the upwardly flowing gaseous stream contacts the downwardly flowing concentrated hydrochloric acid in stripper 10 the dissolved methyl chloride is stripped out of the hydrochloric acid and the hydrogen chloride in the gaseous stream is absorbed by the hydrochloric acid. In the usual operation, the volume of the gas charged to stripper 10 is large in comparison with the volume of hydrochloric acid charged thereto, and is adequate to give substantially complete removal of the methyl chloride. At the same time, the heat capacity of the liquid stream is large in comparison with that of the hydrogen, so that hydrogen leaves the top of the stripper at substantially the temperature of the inlet acid. This temperature preferably is low enough so that there is very little loss of hydrogen chloride in the gaseous stream withdrawn from stripper 10 through line 13 containing valve 14. This stream predominates in hydrogen, but contains some methyl chloride. If desired, this loss may be still further reduced by refluxing the top of the stripper 10 with a small quantity of water.

Because of the relative quantities of the concentrated hydrochloric acid stream charged to stripper 10 and the gaseous stream charged thereto, the concentrated hydrochloric acid stream withdrawn from stripper 10 contains only a slightly higher percentage of HCl than the acid stream charged thereto. The hydrochloric acid from the bottom of stripper 10 is withdrawn through line 15, is picked up by pump 16, and discharged through line 17 containing valve 18 into electrolytic cell 11.

Electrolytic cell 11 is of the diaphragm type, the principal features of which are a closed tank or container, a series of graphite anodes from which chlorine is discharged, the gas escaping through suitable outlets, one or more cathodes separated from the anode compartment by intervening diaphragms, and an outlet for the hydrogen gas. A suitable diaphragm cell is constructed with a crushed graphite anode, and a diaphragm of Vinyon "N" cloth, i. e., cloth made from the copolymer of vinyl chloride and acrylonitrile. The cell ordinarily is operated at elevated temperatures that usually do not exceed a temperature of about 150° C. As chlorine and hydrogen are generated in the cell the hydrochloric acid solution becomes more dilute and is withdrawn and recycled in the manner hereinafter described. It may be desirable at times to periodically reverse the flow of liquid through the cell in order to prevent plugging of the diaphragms. Substantially pure chlorine containing less than about 0.1% hydrogen and substantially no methyl chloride is withdrawn through line 20 containing valve 21. If the stripper were not used, very substantial amounts of methyl chloride would be found in the chlorine stream withdrawn from the cell. Dilute hydrochloric acid, which usually will contain between 8 or 10 to 20% hydrogen chloride, is withdrawn from the electrolytic cell 11 through line 22, picked up by pump 23, and discharged into line 3 containing valve 24 and returned to the top of absorber 2.

From the foregoing, it can be seen that by the use of my process:

1. Hydrogen chloride is inexpensively recovered by absorption from the crude hydrogen stream without the use of costly refrigeration or other cooling means, resulting in an increased yield of chlorine at comparatively little cost.

2. Pure chlorine is produced from contaminated hydrogen chloride.

I claim as my invention:

1. A process for producing chlorine from a gaseous stream comprising hydrogen chloride and methyl chloride which comprises intimately contacting said stream with a stream of dilute hydrochloric acid in an absorption zone, withdrawing from said absorption zone a gaseous stream of methyl chloride substantially free from hydrogen chloride, and a stream of concentrated hydrochloric acid containing methyl chloride dissolved therein, introducing said concentrated hydrochloric acid into the upper portion of a stripping zone and a gaseous stream of hydrogen and hydrogen chloride, produced as hereinafter set forth, into the lower portion of said zone, and therein countercurrently contacting said streams to strip the methyl chloride from the acid and to absorb the gaseous hydrogen chloride in the acid, withdrawing a gaseous stream comprising hydrogen and methyl chloride from the upper portion of said stripping zone and a stream of concentrated hydrochloric acid, substantially free from methyl chloride, from the lower portion thereof, passing the last-mentioned concentrated hydrochloric acid to an electrolytic cell and therein generating a gaseous stream of chlorine, a gaseous stream of hydrogen contaminated with hydrogen chloride, and dilute hydrochloric acid, recovering the chlorine, passing the hydrogen stream to said stripping zone, and passing the dilute hydrochloric acid to said absorption zone.

2. The process of claim 1 in which the concentrated hydrochloric acid streams entering and leaving the stripping zone, respectively contain about 26–34% and 28–36% by weight of hydrogen chloride, and the stream of dilute hydrochloric acid contains about 8–20% by weight of hydrogen chloride.

3. A process for producing chlorine from a gaseous stream comprising hydrogen chloride and at least one other component slightly soluble in hydrochloric acid which comprises intimately contacting said stream with a stream of dilute hydrochloric acid in an absorption zone, withdrawing from said absorption zone a gaseous stream comprising said slightly soluble component substantially free from hydrogen chloride, and a stream of concentrated hydrochloric acid containing a minor proportion of said slightly soluble component dissolved therein, introducing said concentrated hydrochloric acid into the upper portion of a stripping zone and introducing a gaseous stream of hydrogen and hydrogen chloride, produced as hereinafter set forth, into the lower portion of said stripping zone and therein counter-currently contacting said stream to strip the slightly soluble component from the acid and to absorb the gaseous hydrogen chloride in the acid, withdrawing a gaseous stream comprising hydrogen and the slightly soluble component from the upper portion of said stripping zone and a stream of concentrated hydrochloric acid, substantially free from said slightly soluble component, from the lower portion thereof, passing the last-mentioned concentrated hydrochloric acid to an electrolytic cell and therein generating a gaseous stream of chlorine, a gaseous stream of hydrogen contaminated with hydrogen chloride, and dilute hydrochloric acid, recovering the chlorine, passing the hydrogen stream to said stripping zone, and passing the dilute hydrochloric acid to said absorption zone.

4. The process of claim 3 in which said other contaminating component comprises an alkyl chloride.

5. The process of claim 3 in which said other contaminating component comprises methyl chloride.

References Cited in the file of this patent

UNITED STATES PATENTS

| | | |
|---|---|---|
| 1,186,306 | Greenawalt | June 6, 1916 |
| 1,847,435 | Low | Mar. 1, 1932 |

FOREIGN PATENTS

| | | |
|---|---|---|
| 356,115 | France | Sept. 22, 1905 |

OTHER REFERENCES

Roberts: Chemical Engineering Progress, vol. 46, No. 9, September 1950, pp. 456–57.